United States Patent
Lim et al.

(10) Patent No.: US 9,846,804 B2
(45) Date of Patent: Dec. 19, 2017

(54) APPARATUS AND METHOD FOR CREATING THREE-DIMENSIONAL PERSONALIZED FIGURE

(71) Applicant: Electronics and Telecommunications Research Institute, Daejeon (KR)

(72) Inventors: Seong-Jae Lim, Daejeon (KR); Bon-Woo Hwang, Daejeon (KR); Kap-Kee Kim, Daejeon (KR); Seung-Uk Yoon, Daejeon (KR); Hye-Ryeong Jun, Daejeon (KR); Jin-Sung Choi, Daejeon (KR); Bon-Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 323 days.

(21) Appl. No.: 14/637,344

(22) Filed: Mar. 3, 2015

(65) Prior Publication Data

US 2015/0254502 A1     Sep. 10, 2015

(30) Foreign Application Priority Data

Mar. 4, 2014   (KR) .................. 10-2014-0025530

(51) Int. Cl.
  *G06K 9/00*     (2006.01)
  *G05B 19/4093*  (2006.01)
  (Continued)

(52) U.S. Cl.
  CPC .......... *G06K 9/00302* (2013.01); *B33Y 80/00* (2014.12); *G05B 19/40931* (2013.01);
  (Continued)

(58) Field of Classification Search
  CPC .............. G06T 17/00; G06T 15/04; G06T 2207/30201; G06T 7/593; G06T 3/0012;
  (Continued)

(56) References Cited

U.S. PATENT DOCUMENTS 5,864,482 A * 1/1999 Hazama ............. G05B 19/4097
                                                   700/182
5,971,589 A * 10/1999 Hazama ............. G05B 19/4097
                                                   700/145

(Continued)

FOREIGN PATENT DOCUMENTS

| JP | 2010-128742 A | 6/2010 |
| KR | 10-2012-0102275 A | 9/2012 |
| KR | 10-2014-0003880 A | 1/2014 |

OTHER PUBLICATIONS

Soon-Hyoling Pyo et al., "Trends of 3D Printing Software Technologies", Electronics and Telecommunications Trends, Feb. 2014, pp. 1-10, vol. 29, No. 1, Electronics and Telecommunications Research Institute.

(Continued)

*Primary Examiner* — Aklilu Woldemariam

(57) ABSTRACT

Disclosed herein is an apparatus and method for automatically creating a 3D personalized figure suitable for 3D printing by detecting a face area and features for respective regions from face data acquired by heterogeneous sensors and by optimizing global/local transformation. The 3D personalized figure creation apparatus acquires face data of a user corresponding to a reconstruction target; extracts feature points for respective regions from the face data, and reconstructs unique 3D models of the user's face, based on the extracted feature points; creates 3D figure models based on the unique 3D models and previously stored facial expression models and body/adornment models; and verifies whether each 3D figure model has a structure and a shape (Continued)

corresponding to actual 3D printing, corrects and edits the 3D figure model based on results of verification, and outputs a 3D figure model corresponding to 3D printing.

9 Claims, 8 Drawing Sheets

(51) Int. Cl.
  *B33Y 80/00* (2015.01)
  *G06T 19/20* (2011.01)
(52) U.S. Cl.
  CPC ..... *G06K 9/00214* (2013.01); *G06K 9/00268* (2013.01); *G06T 19/20* (2013.01); *G05B 2219/2636* (2013.01); *G05B 2219/49023* (2013.01); *G06K 9/00* (2013.01); *Y02P 90/265* (2015.11)
(58) Field of Classification Search
  CPC ....... G06T 2207/10016; G06T 2210/44; G06T 7/12; G06T 7/75; G06T 19/20; G06T 2207/30196; G06T 7/30; G06T 15/00; G06T 2219/2016; G06T 7/66; A63F 13/5252; A63F 2300/1087; A63F 2300/695; G06F 17/50; G06F 17/30843; G06F 17/30259; G06F 17/30277; G06K 9/00201; G06K 9/00711; G06K 9/6203; G06K 9/00214; G06K 9/00275; G06K 9/00308; G06K 9/00268; G06K 9/00302; G06K 9/00369; G06K 9/00221; G06K 9/00281; G06K 9/00335; G06K 2209/19; G06K 9/3208; G05B 2219/2636; G05B 2219/49023; H04N 7/181; H04N 7/188; Y02P 90/265; G06N 3/10
  USPC .......... 382/154, 285; 345/419, 420, 441, 646
  See application file for complete search history.

(56) References Cited

U.S. PATENT DOCUMENTS

| | | | | |
|---|---|---|---|---|
| 6,556,196 | B1* | 4/2003 | Blanz | G06K 9/00275 345/419 |
| 7,013,191 | B2* | 3/2006 | Rubbert | B33Y 50/00 433/8 |
| 7,492,364 | B2* | 2/2009 | Devarajan | G06T 17/00 345/419 |
| 2007/0156625 | A1* | 7/2007 | Visel | G06N 3/02 706/62 |
| 2007/0282765 | A1* | 12/2007 | Visel | G06N 3/02 706/14 |
| 2010/0177955 | A1* | 7/2010 | Simakov | G06F 17/30843 382/154 |
| 2011/0148868 | A1 | 6/2011 | Chang et al. | |
| 2012/0002840 | A1* | 1/2012 | Linnenbank | G06K 9/32 382/103 |
| 2012/0183238 | A1 | 7/2012 | Savvides et al. | |
| 2013/0226528 | A1 | 8/2013 | Hodgins et al. | |
| 2014/0043329 | A1* | 2/2014 | Wang | G06T 17/20 345/420 |
| 2014/0204089 | A1* | 7/2014 | Lim | G06K 9/00275 345/427 |
| 2015/0109442 | A1* | 4/2015 | Derenne | G08B 21/245 348/143 |

OTHER PUBLICATIONS

Brett Allen et al., "The space of human body shapes: reconstruction and parameterization from range scans," ACM SIGGRAPH, Jul. 27-31, 2003, pp. 1-8.

* cited by examiner

APPARATUS AND METHOD FOR CREATING THREE-DIMENSIONAL PERSONALIZED FIGURE

CROSS REFERENCE TO RELATED APPLICATION

This application claims the benefit of Korean Patent Application No. 10-2014-0025530 filed Mar. 4, 2014, which is hereby incorporated by reference in its entirety into this application.

BACKGROUND OF THE INVENTION

1. Technical Field

The present invention generally relates to an apparatus and method for creating a three-dimensional (3D) figure and, more particularly, to an apparatus and method for automatically creating a 3D personalized figure suitable for 3D printing by detecting a face area and features for respective regions from face data acquired by heterogeneous sensors and by optimizing global/local transformation.

2. Description of the Related Art

Generally, methods of creating a 3D face model include methods of scanning static appearance information of an entity using an active sensor such as laser or pattern light; methods of creating a 3D face model either using multiview or stereo images in which conditions such as lighting, sensor geometric information, and viewpoints are previously set, or using a depth sensor or the like; and methods of a skilled expert manually creating a 3D model, etc.

For example, U.S. Patent Application Publication No. 2011-0148868 entitled "Apparatus and Method for Reconstructing Three-Dimensional Face Avatar through Stereo Vision and Face Detection" discloses a process for generating the face of a 3D avatar using a stereo vision system and a face detector.

Further, Korean Patent Application Publication No. 2012-0102275 entitled "Virtual Service System For Hair and Method thereof, and Device Supporting the Same" discloses technology for creating a 3D model by performing 3D rendering on the face and head of a user, and applying a specific hair object to the corresponding 3D model.

In this way, among the conventional methods of creating a 3D face model, the scanning method requires a post-processing method conducted by an expert, and the existing sensor-based method is disadvantageous in that good results can be obtained only in a preset condition. Further, since multiple cameras must be used, various disadvantages such as problems with synchronization between cameras, color coincidence, and geometric correction are present. Furthermore, a problem arises in that appearance data generated by scanning the overall region of a head including a face or by capturing only a part of the face is composed of a large number of unrefined dummy meshes having holes or overlapping, or includes only a part of face data, and thus it is not suitable to directly apply the appearance data to 3D printing.

SUMMARY OF THE INVENTION

Accordingly, the present invention has been made keeping in mind the above problems occurring in the prior art, and an object of the present invention is to provide an apparatus and method for creating a 3D personalized figure suitable for 3D printing by detecting a face area and features for respective regions from face data acquired by heterogeneous sensors and by optimizing global/local transformation.

In accordance with an aspect of the present invention to accomplish the above object, there is provided a method for creating a three-dimensional (3D) personalized figure, the method being performed by an apparatus for creating a 3D personalized figure, including acquiring face data of a user corresponding to a reconstruction target; extracting feature points for respective regions from the face data, and reconstructing unique 3D models of the user's face, based on the extracted feature points; creating 3D figure models based on the unique 3D models and previously stored facial expression models and body/adornment models; and verifying whether each 3D figure model has a structure and a shape corresponding to actual 3D printing, correcting and editing the 3D figure model based on results of verification, and outputting a 3D figure model corresponding to 3D printing.

Reconstructing the unique 3D models of the user's face may include generating a front image based on the face data; detecting a face area from the front image; detecting feature points for respective regions from the face area; detecting 3D corresponding points of the face data corresponding to the feature points of a 3D standard model, based on the feature points for respective regions, and then matching and transforming appearance information of the 3D standard model; generating a face texture map using the transformed appearance information of the 3D standard model and the front image; and creating the unique 3D models of the user's face using the face texture map.

Creating the unique 3D models of the user's face may include creating the unique 3D models of the user's face based on a procedure of causing a color of a remaining area of the face, which is not captured, to match a color of the face area, which is captured, using the face texture map.

Creating the 3D figure models may include generating facial expressions that match an actually input facial expression of the user, based on the unique 3D models and the previously stored facial expression models; creating adorned unique 3D models by combining the previously stored body/adornment models with the unique 3D models; and selecting a facial expression and a body/adornment model that stochastically match those of the actual user from among the created facial expressions and from among the adorned unique 3D models, respectively, and creating the 3D figure models based on the results of selection.

The face data may correspond to a 3D unrefined mesh model.

In accordance with another aspect of the present invention to accomplish the above object, there is provided an apparatus for creating a 3D personalized figure, including an information acquisition unit for acquiring face data of a user corresponding to a reconstruction target; a face reconstruction unit for extracting feature points for respective regions from the face data, and reconstructing unique 3D models of the user's face, based on the extracted feature points; a model creation unit for creating 3D figure models based on the unique 3D models and previously stored facial expression models and body/adornment models; and a model verification unit for verifying whether each 3D figure model has a structure and a shape corresponding to actual 3D printing, correcting and editing the 3D figure model based on results of verification, and outputting a 3D figure model corresponding to 3D printing.

The information acquisition unit may acquire the face data of the user corresponding to the reconstruction target using heterogeneous sensors.

The face data may correspond to a 3D unrefined mesh model.

The face reconstruction unit may include a generation unit for generating a front image based on the face data; a face area detection unit for detecting a face area from the front image; a feature point detection unit for detecting feature points for respective regions from the face area; a matching and transformation unit for detecting 3D corresponding points of the face data corresponding to the feature points of a 3D standard model, based on the feature points for respective regions, and then matching and transforming appearance information of the 3D standard model; a texture map generation unit for generating a face texture map using the transformed appearance information of the 3D standard model and the front image; and a unique 3D model creation unit for creating the unique 3D models of the user's face using the face texture map.

The unique 3D model creation unit may create the unique 3D models of the user's face based on a procedure of causing a color of a remaining area of the face, which is not captured, to match a color of the face area, which is captured, using the face texture map.

The model creation unit may include a facial expression generation unit for generating facial expressions that match an actually input facial expression of the user, based on the unique 3D models and the previously stored facial expression models; a body/adornment model creation unit for creating adorned unique 3D models by combining the previously stored body/adornment models with the unique 3D models; and a selection unit for selecting a facial expression and a body/adornment model that stochastically match those of the actual user from among the created facial expressions and from among the adorned unique 3D models, respectively, and creating the 3D figure models based on the results of selection.

The model creation unit may be configured such that a facial expression model storage unit including the facial expression models and a body/adornment model storage unit including the body/adornment models are operated in conjunction with each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
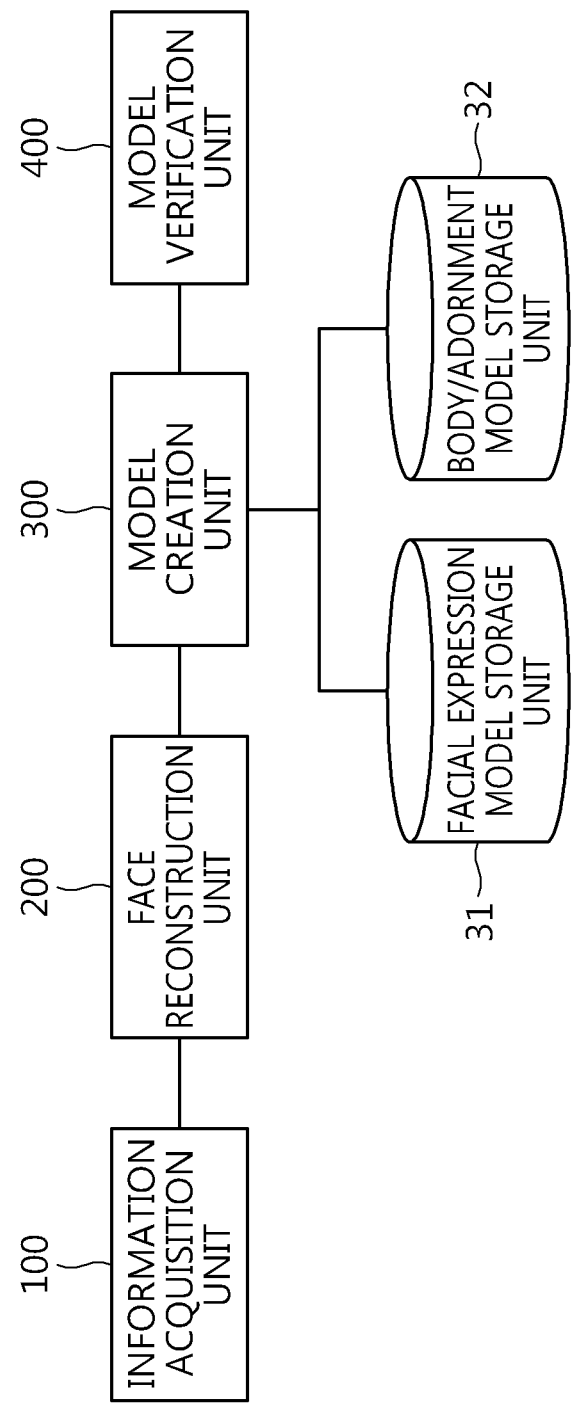
FIG. 1 is a configuration diagram schematically showing an apparatus for creating a 3D personalized figure according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, an apparatus and method for creating a 3D personalized figure according to preferred embodiments of the present invention will be described in detail with reference to the attached drawings.

FIG. 1 is a configuration diagram schematically showing an apparatus for creating a 3D personalized figure according to an embodiment of the present invention.

Referring to FIG. 1, the 3D personalized figure creation apparatus includes an information acquisition unit 100, a face reconstruction unit 200, a model creation unit 300, a facial expression model storage unit 31, a body/adornment model storage unit 32, and a model verification unit 400.

The information acquisition unit 100 acquires the face data (=3D unrefined mesh model) of a user corresponding to a reconstruction target using heterogeneous sensors.

The face reconstruction unit 200 extracts feature points for respective regions based on statistical feature information, and reconstructs unique 3D models of the user's face based on the extracted feature points.

The model creation unit 300 creates various 3D figure models stochastically matching an actual user, based on the unique 3D models reconstructed by the face reconstruction unit 200, facial expression models stored in the facial expression model storage unit 31, and body/adornment models stored in the body/adornment model storage unit 32.

The model verification unit 400 verifies whether each 3D figure model created by the model creation unit 300 has a structure and shape suitable for actual 3D printing, corrects and edits the 3D figure model based on the results of verification, and outputs a 3D figure model suitable for 3D printing.

Below, the face reconstruction unit 200 will be described in detail with reference to FIG. 2.

Figure 2:
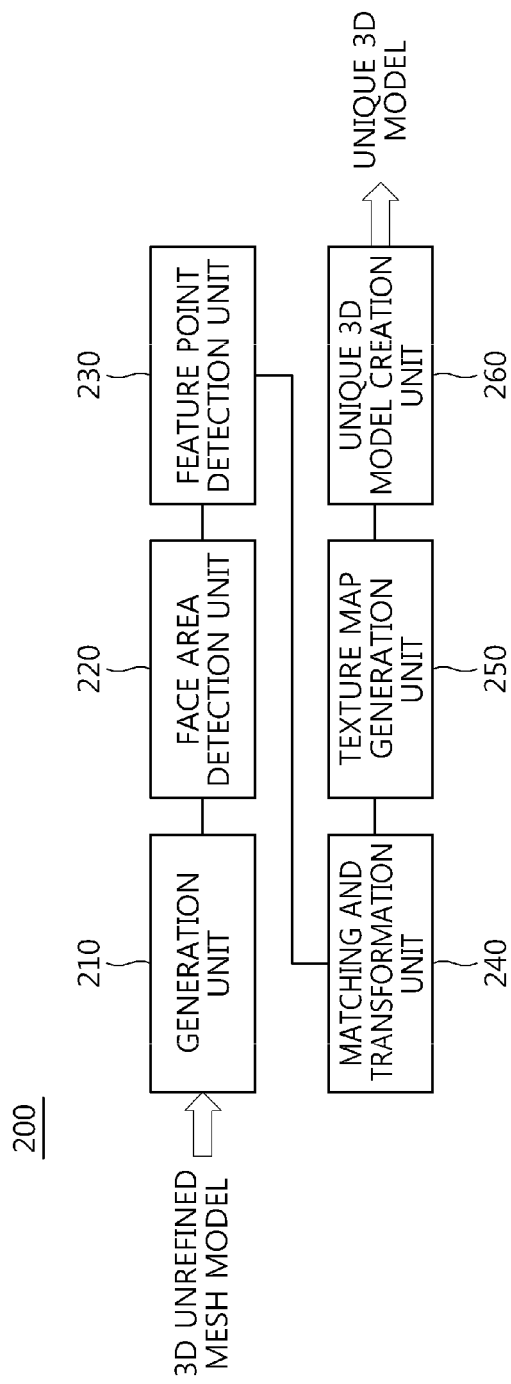
FIG. 2 is a diagram showing a face reconstruction unit according to an embodiment of the present invention.

FIG. 2 is a diagram showing the face reconstruction unit according to an embodiment of the present invention.

Referring to FIG. 2, the face reconstruction unit 200 includes a generation unit 210, a face area detection unit 220, a feature point detection unit 230, a matching and transformation unit 240, a texture map generation unit 250, and a unique 3D model creation unit 260.

The generation unit 210 generates a front image based on face data (=3D unrefined mesh model).

The face area detection unit 220 detects a face area from the front image.

The feature point detection unit 230 automatically detects feature points for respective regions from the face area detected by the face area detection unit 220.

The matching and transformation unit 240 detects 3D corresponding points of a 3D unrefined mesh model, corresponding to the feature points of a 3D standard model, based on feature points detected by the feature point detection unit 230, and matches and transforms the appearance information of the 3D standard model using a global and local transformation optimization technique.

The texture map generation unit 250 generates a face texture map using both the transformed appearance information of the 3D standard model and the front image.

The unique 3D model creation unit 260 creates unique 3D models of the user's face using a procedure of causing the color of the remaining area of the face, which is not captured, to match the color of the face area, which is captured, using the face texture map.

Below, the model creation unit 300 will be described in detail with reference to FIG. 3.

Figure 3:
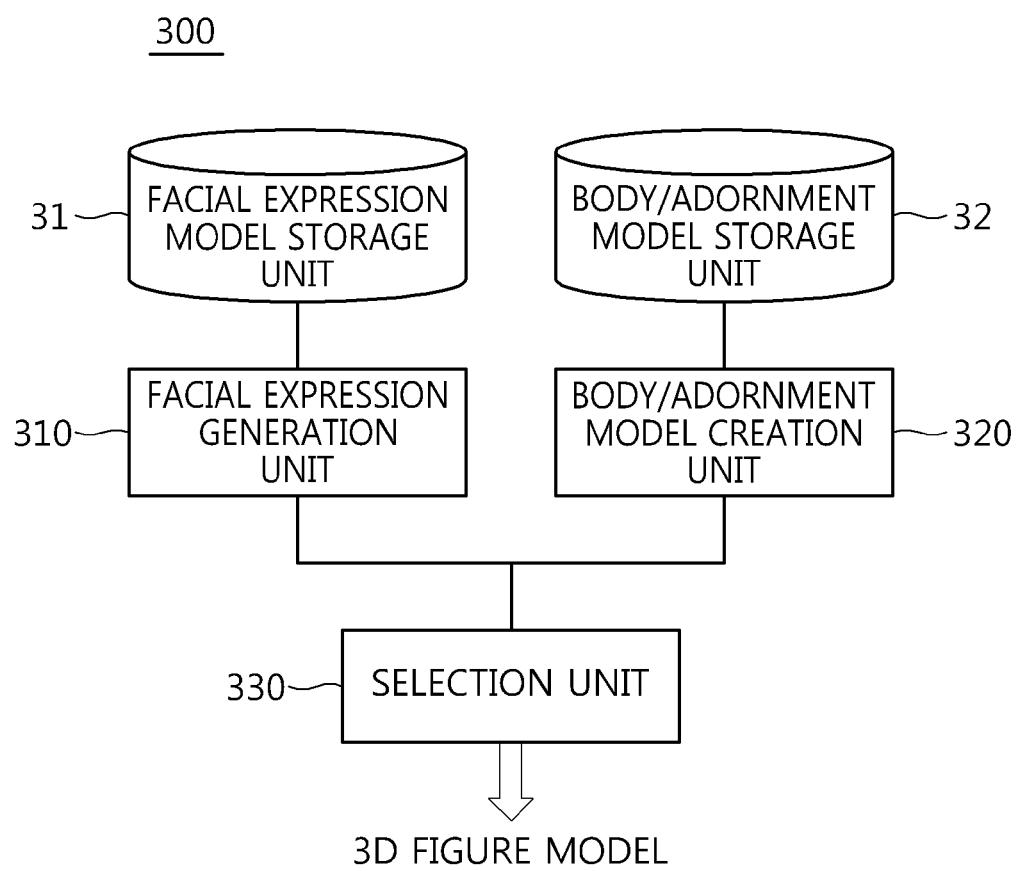
FIG. 3 is a diagram showing a model creation unit according to an embodiment of the present invention.

FIG. 3 is a diagram showing the model creation unit according to an embodiment of the present invention.

Referring to FIG. 3, the model creation unit 300 includes a facial expression generation unit 310, a body/adornment model creation unit 320, and a selection unit 330.

The facial expression generation unit 310 transforms the appearance of each unique 3D model created by the face reconstruction unit 200, based on statistical feature-based 3D facial expression models stored in the facial expression model storage unit 31, and generates various facial expressions matching the actually input facial expression of the user.

The body/adornment model creation unit 320 creates adorned unique 3D models by combining the unique 3D models created by the face reconstruction unit 200 with body/adornment models stored in the body/adornment model storage unit 32.

The selection unit 330 selects a facial expression stochastically matching that of the actual user from among the facial expressions generated by the facial expression generation unit 310 and a body/adornment model stochastically matching that of the actual user from among the adorned unique 3D models created by the body/adornment model creation unit 320, and then creates a final 3D figure model based on the selected facial expression and body/adornment model. Generally, figures may be created in various shapes by adding bodies, hairstyles, beard/mustache, glasses, hats, accessories, etc. conforming to various themes.

Below, the model verification unit 400 will be described in detail with reference to FIG. 4.

Figure 4:
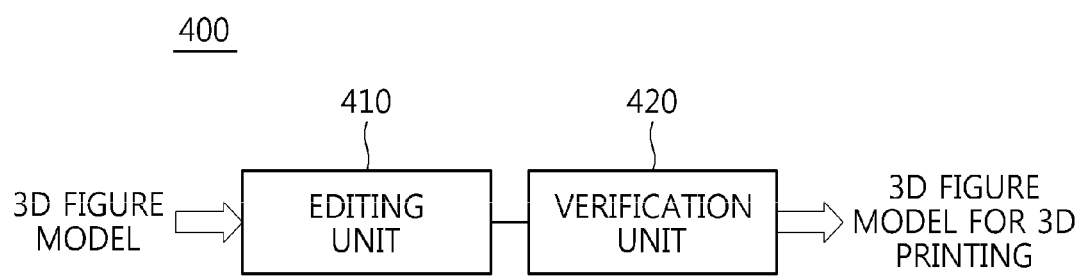
FIG. 4 is a diagram showing a model verification unit according to an embodiment of the present invention.

FIG. 4 is a diagram showing the model verification unit according to an embodiment of the present invention.

Referring to FIG. 4, the model verification unit 400 includes an editing unit 410 and a verification unit 420.

The editing unit 410 corrects and edits the 3D figure model created by the model creation unit 300 in consideration of printing suitability (internal/external thicknesses, joint states, etc.), supportability, and safety which are required by various 3D printers.

The verification unit 420 verifies the 3D printing suitability/supportability/safety of the 3D figure model corrected and edited by the editing unit 410, and outputs a final 3D figure model suitable for 3D printing from the results of verification.

The verification unit 420 may verify the 3D printing suitability/supportability/safety of the 3D figure model by comparing printing values corresponding to the 3D figure model with previously stored reference values. Here, the printing values correspond to the concept of typical numerical values required when a 3D figure model is printed using a 3D printer. Further, the reference values correspond to the concept of numerical values for a structure and a shape corresponding to actual 3D printing.

In this way, the 3D personalized figure creation apparatus according to the embodiment of the present invention may reconstruct the appearance of a 3D face by matching and transforming a 3D standard model, into which statistical 3D facial feature vectors are incorporated, using unrefined mesh data of the face (face data of the user) acquired from various heterogeneous sensors, and may incorporate various 3D body/adornment models into the reconstructed 3D face appearance and transform the reconstructed 3D face appearance, thus automatically creating various 3D personalized figure models.

Below, a method for creating a 3D personalized figure will be described in detail with reference to FIG. 5.

Figure 5:
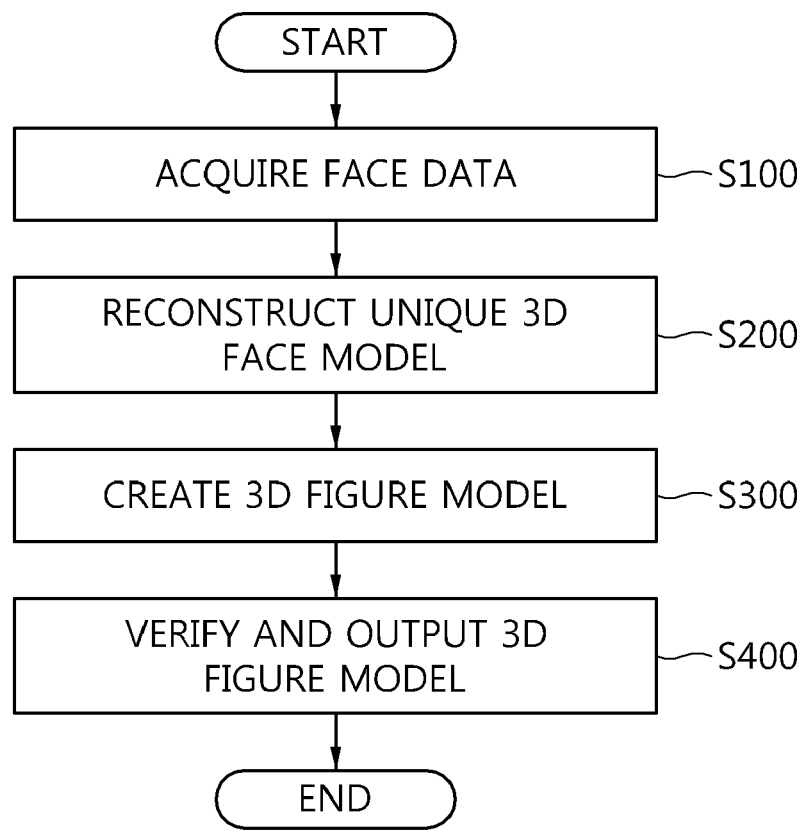
FIG. 5 is a flowchart showing a method for creating a 3D personalized figure according to an embodiment of the present invention.

FIG. 5 is a flowchart showing a method for creating a 3D personalized figure according to an embodiment of the present invention.

Referring to FIG. 5, the 3D personalized figure creation apparatus acquires face data of the user (=3D unrefined mesh model) corresponding to a reconstruction target using heterogeneous sensors at step S100.

The 3D personalized figure creation apparatus extracts features points for respective regions from the 3D unrefined mesh model acquired at step S100 based on statistical feature information, and reconstructs unique 3D models of the user's face based on the extracted feature points at step S200.

The 3D personalized figure creation apparatus creates various 3D figure models stochastically matching the actual user, based on the unique 3D models reconstructed at step S200, facial expression models stored in the facial expression model storage unit 31, and body/adornment models stored in the body/adornment model storage unit 32 at step S300.

The 3D personalized figure creation apparatus verifies whether each created 3D figure model has a structure and a shape suitable for actual 3D printing, corrects and edits the 3D figure model based on the results of verification, and then outputs a 3D figure model suitable for 3D printing at step S400.

In greater detail, the 3D personalized figure creation apparatus may verify 3D printing suitability/supportability/safety by comparing printing values corresponding to the 3D figure model with previously stored reference values. Here, the printing values correspond to the concept of typical numerical values required when a 3D figure model is printed using a 3D printer, and the reference values correspond to the concept of numerical values corresponding to a structure and a shape for actual 3D printing.

Below, a procedure of reconstructing a unique 3D model and a procedure of creating a 3D figure model will be described in detail with reference to FIG. 6.

Figure 6:
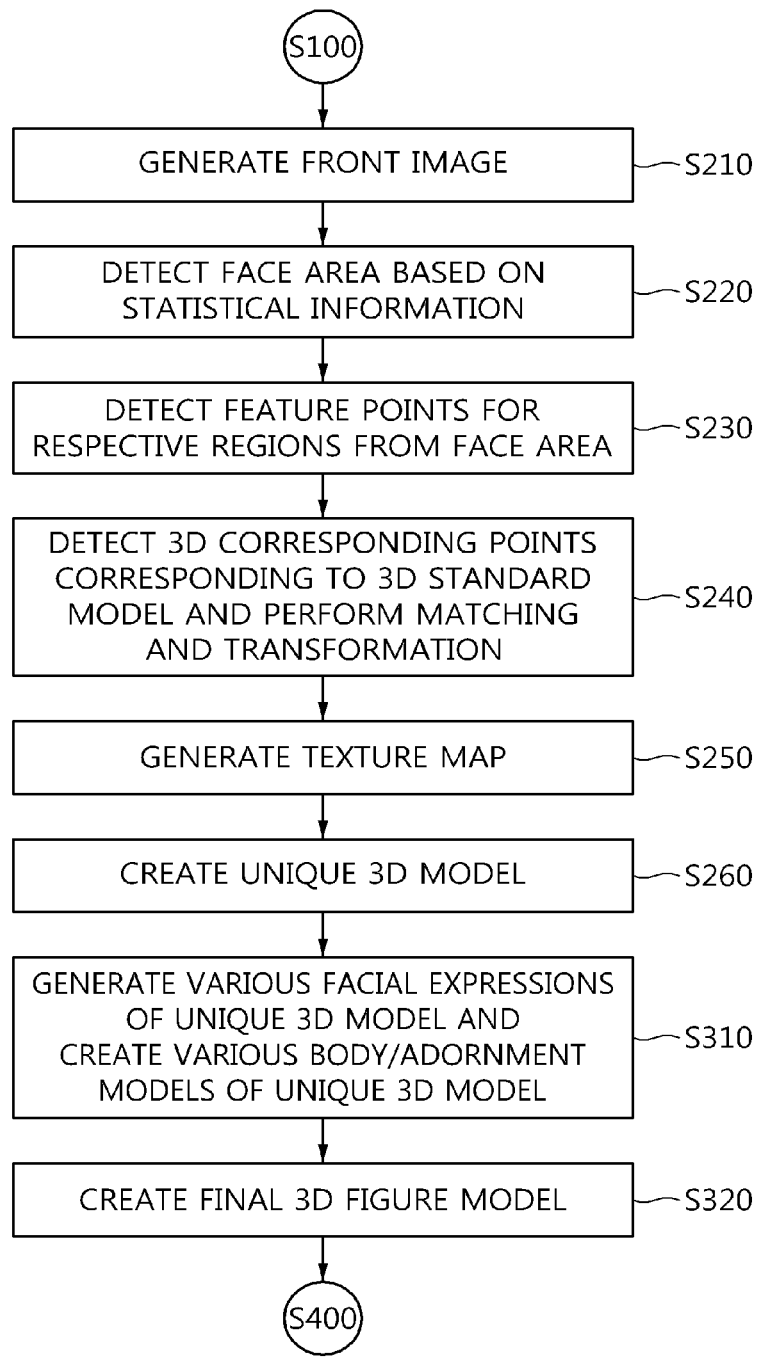
FIG. 6 is a flowchart showing a procedure of reconstructing a unique 3D model and a procedure of creating a 3D figure model according to an embodiment of the present invention.

FIG. 6 is a flowchart showing a procedure of reconstructing a unique 3D model and a procedure of creating a 3D figure model according to an embodiment of the present invention.

Referring to FIG. 6, the 3D personalized figure creation apparatus generates a front image based on the face data (=3D unrefined mesh model), acquired at step S100, at step S210.

The 3D personalized figure creation apparatus detects a face area from the front image at step S220.

The 3D personalized figure creation apparatus automatically detects feature points for respective regions from the face area, detected at step S220, at step S230.

The 3D personalized figure creation apparatus detects 3D corresponding points of the 3D unrefined mesh model corresponding to the feature points of a 3D standard model, based on the feature points detected at step S230, and thus performs matching and transformation on the appearance information of the 3D standard model using a global and local transformation optimization technique at step S240.

The 3D personalized figure creation apparatus generates a face texture map using the appearance information of the 3D standard model transformed at step S240 and the front image at step S250.

The 3D personalized figure creation apparatus creates unique 3D models of the face based on a procedure of causing the color of the remaining area of the face, which is not captured, to match the color of the face area, which is captured, using the face texture map, at step S260.

The 3D personalized figure creation apparatus generates various facial expressions of the unique 3D models created at step S260, and creates adorned unique 3D models by combining the body/adornment models with the unique 3D models created at step S260 at step S310.

The 3D personalized figure creation apparatus selects a facial expression stochastically matching that of the actual user from among the facial expressions generated at step S310 and a body/adornment model stochastically matching that of the actual user from among the adorned unique 3D models, and creates a final 3D figure model based on the selected facial expression and body/adornment model at step S320.

Below, a procedure of outputting a 3D figure model suitable for 3D printing will be described in detail with reference to FIG. 7.

Figure 7:
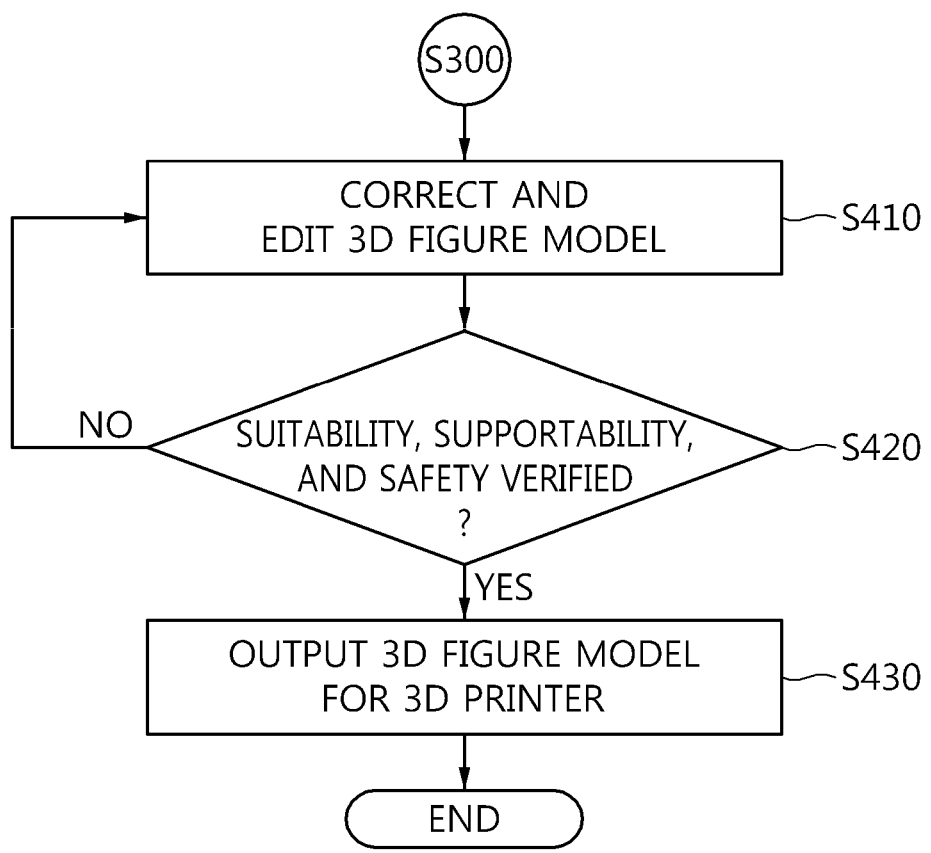
FIG. 7 is a flowchart showing a procedure of outputting a 3D figure model suitable for 3D printing according to an embodiment of the present invention.

FIG. 7 is a flowchart showing a procedure of outputting a 3D figure model suitable for 3D printing according to an embodiment of the present invention.

Referring to FIG. 7, the 3D personalized figure creation apparatus corrects and edits each 3D figure model created at step S300 in consideration of printing suitability (internal/external thicknesses, joint states, etc.), supportability, and safety which are required by various 3D printers at step S410.

The 3D personalized figure creation apparatus verifies the 3D printing suitability/supportability/safety of the 3D figure model, corrected and edited at step S410, at step S420.

When verification has failed at step S420, the 3D personalized figure creation apparatus corrects and edits the 3D figure model again, whereas when the verification has succeeded at step S420, the 3D personalized figure creation apparatus outputs a final 3D figure model suitable for 3D printing at step S430.

In this way, the present invention reconstructs a desirably refined 3D personalized face appearance that is suitable for 3D printing by means of the transformation and transition of a 3D standard model by automatically detecting feature information based on statistical 3D facial features using unrefined mesh data of the face acquired from various heterogeneous sensors, generates texture of the 3D face model based on the color information of a face area from an input image, and then reproduces the realistic color of the face. Further, the present invention may automatically create various 3D personalized figure models by incorporating facial expression/body/adornment models such as various 3D facial expressions, bodies, hairstyles, beard/mustache, glasses, hats, and accessories into the reconstructed unique 3D personalized face model and by transforming the reconstructed unique 3D personalized face model.

Furthermore, the present invention may print the results of correction/editing of 3D personalized figure models by testing the 3D personalized figure models for suitability (appearance thickness, joint states, etc.), supportability, and safety for 3D printing, and may then utilize the 3D personalized figure models for various purposes such as the creation of 3D personalized figures and the setup of personal busts.

In accordance with the present invention, the present invention may create 3D personalized figures suitable for 3D printing by detecting a face area and features for respective regions from face data acquired by heterogeneous sensors and by optimizing global/local transformation.

Further, the present invention may accommodate various heterogeneous sensor inputs and automatically create various 3D personalized figures suitable for 3D printing.

Figure 8:
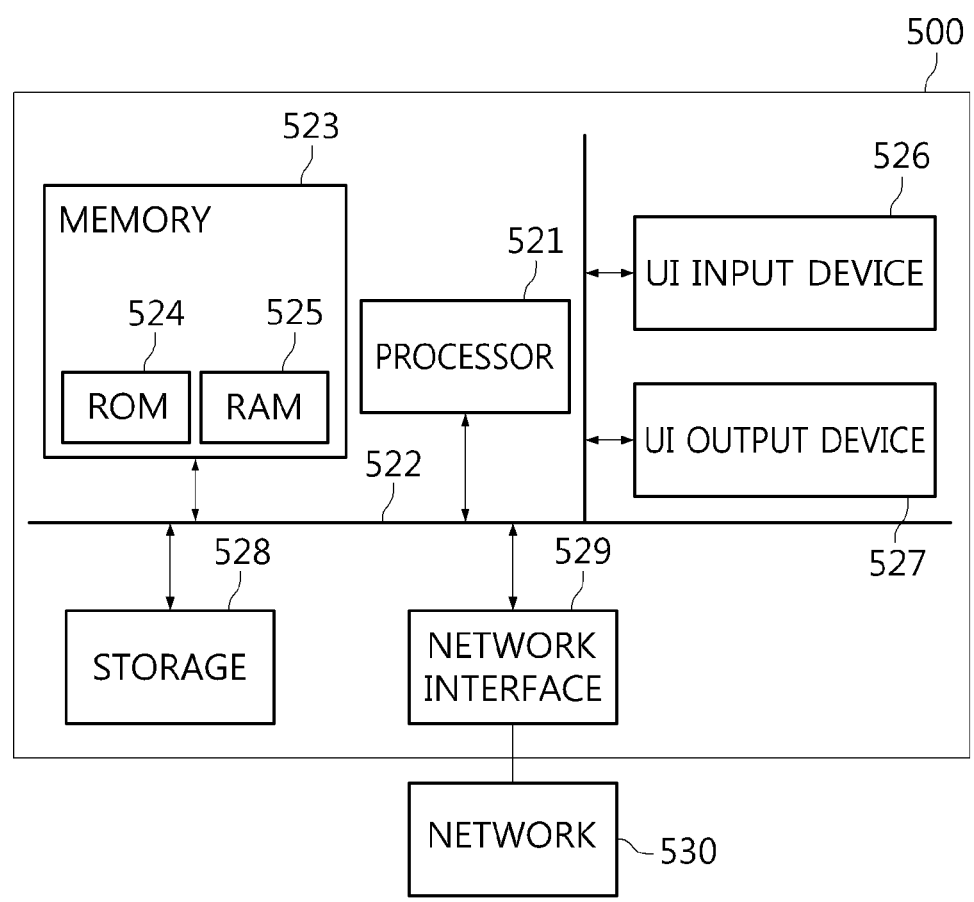
FIG. 8 illustrates a computer that implements an operation apparatus according to an example.

FIG. 8 illustrates a computer that implements the apparatus for creating a 3D personalized figure.

The apparatus for creating a 3D personalized figure may be implemented as a computer 500 illustrated in FIG. 8.

The apparatus for creating a 3D personalized figure may be implemented in a computer system including a computer-readable storage medium. As illustrated in FIG. 8, the computer 500 may include at least one processor 521, memory 523, a user interface (UI) input device 526, a UI output device 527, and storage 528 that can communicate with each other via a bus 522. Furthermore, the computer 500 may further include a network interface 529 that is connected to a network 530. The processor 521 may be a semiconductor device that executes processing instructions stored in a central processing unit (CPU), the memory 523 or the storage 528. The memory 523 and the storage 528 may be various types of volatile or nonvolatile storage media. For example, the memory may include ROM (read-only memory) 524 or random access memory (RAM) 525.

At least one unit of the apparatus for creating a 3D personalized figure may be configured to be stored in the memory 523 and to be executed by at least one processor 521. Functionality related to the data or information communication of the apparatus for creating a 3D personalized figure may be performed via the network interface 529.

The at least one processor 521 may perform the above-described operations, and the storage 528 may store the above-described constants, variables and data, etc.

The methods according to embodiments of the present invention may be implemented in the form of program instructions that can be executed by various computer means. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

At least one embodiment of the present invention provides an operation method and apparatus for implementing a compression function for fast message hashing.

At least one embodiment of the present invention provides an operation method and apparatus for implementing a compression function that are capable of enabling message hashing while ensuring protection from attacks.

At least one embodiment of the present invention provides an operation method and apparatus for implementing a compression function that use combinations of bit operators commonly used in a central processing unit (CPU), thereby enabling fast parallel processing and also reducing the computation load of a CPU.

At least one embodiment of the present invention provides an operation method and apparatus that enable the structure of a compression function to be defined with respect to inputs having various lengths.

Although the present invention has been described in conjunction with the limited embodiments and drawings, the present invention is not limited thereto, and those skilled in the art will appreciate that various modifications, additions and substitutions are possible from this description. For example, even when described technology is practiced in a sequence different from that of a described method, and/or components, such as systems, structures, devices, units, and/or circuits, are coupled to or combined with each other in a form different from that of a described method and/or one or more thereof are replaced with one or more other components or equivalents, appropriate results may be achieved.

Therefore, other implementations, other embodiments and equivalents to the claims fall within the scope of the attached claims.

What is claimed is:

1. A method for creating a three-dimensional (3D) personalized figure, the method being performed by an apparatus for creating a 3D personalized figure, comprising:
    acquiring face data captured by a plurality of heterogeneous sensors of a user corresponding to a reconstruction target;
    extracting feature points for respective regions from the face data, and reconstructing unique 3D models of the user's face, based on the extracted feature points;
    creating 3D figure models based on the unique 3D models and previously stored facial expression models and body/adornment models by:
    generating facial expressions that match an actually input facial expression of the user, based on the unique 3D models and the previously stored facial expression models; and
    selecting a facial expression that stochastically matches a facial expression of the actual user from among the created facial expressions, and creating the 3D figure models based on the selected facial expression;
    verifying whether each 3D figure model has a structure and a shape corresponding to actual 3D printing;
    correcting and editing the 3D figure model based on results of the verification; and
    outputting a 3D figure model corresponding to 3D printing,
    wherein reconstructing the unique 3D models of the user's face comprises:
    generating a front image based on the face data;
    detecting a face area from the front image;
    detecting feature points for respective regions from the face area;
    detecting 3D corresponding points of the face data corresponding to the feature points of a 3D standard model, based on the feature points for respective regions, and then matching and transforming appearance information of the 3D standard model;
    generating a face texture map using the transformed appearance information of the 3D standard model and the front image; and creating the unique 3D models of the user's face using the face texture map.

2. The method of claim 1, the unique 3D models of the user's face comprises creating the unique 3D models of the user's face based on a procedure of causing a color of a remaining area of the face, which is not captured, to match a color of the face area, which is captured, using the face texture map.

3. The method of claim 1, wherein creating the 3D figure models comprises:
    creating adorned unique 3D models by combining the previously stored body/adornment models with the unique 3D models; and
    selecting a body/adornment model that stochastically matches that of the actual user from among the adorned unique 3D models.

4. The method of claim 1, wherein the face data corresponds to a 3D unrefined mesh model.

5. An apparatus for creating a 3D personalized figure, comprising:
    an information acquisition unit for acquiring face data of a user corresponding to a reconstruction target from a plurality of heterogeneous sensors;
    a face reconstruction unit for extracting feature points for respective regions from the face data, and reconstructing unique 3D models of the user's face, based on the extracted feature points;
    a model creation unit for creating 3D figure models based on the unique 3D models and previously stored facial expression models and body/adornment models; and
    a facial expression generation unit for generating facial expressions that match an actually input facial expression of the user, based on the unique 3D models and the previously stored facial expression models;
    a selection unit for selecting a facial expression that stochastically matches that of the actual user from among the created facial expressions, and creates the 3D figure models based on the results of selection;
    a model verification unit for verifying whether each 3D figure model has a structure and a shape corresponding to actual 3D printing, correcting and editing the 3D figure model based on results of verification, and outputting a 3D figure model corresponding to 3D printing,
    wherein the face reconstruction unit comprises:
    a generation unit for generating a front image based on the face data;
    a face area detection unit for detecting a face area from the front image;
    a feature point detection unit for detecting feature points for respective regions from the face area;
    a matching and transformation unit for detecting 3D corresponding points of the face data corresponding to the feature points of a 3D standard model, based on the feature points for respective regions, and then matching and transforming appearance information of the 3D standard model;
    a texture map generation unit for generating a face texture map using the transformed appearance information of the 3D standard model and the front image; and a unique 3D model creation unit for creating the unique 3D models of the user's face using the face texture map.

6. The apparatus of claim 5, wherein the face data corresponds to a 3D unrefined mesh model.

7. The apparatus of claim 5, wherein the unique 3D model creation unit creates the unique 3D models of the user's face based on a procedure of causing a color of a remaining area of the face, which is not captured, to match a color of the face area, which is captured, using the face texture map.

8. The apparatus of claim 5, wherein the model creation unit comprises:
- a body/adornment model creation unit for creating adorned unique 3D models by combining the previously stored body/adornment models with the unique 3D models;
- wherein the selection unit selects a body/adornment model that stochastically matches that of the actual user from among the adorned unique 3D models.

9. The apparatus of claim 8, wherein the model creation unit is configured such that a facial expression model storage unit including the facial expression models and a body/adornment model storage unit including the body/adornment models are operated in conjunction with each other.

\* \* \* \* \*